United States Patent
Nakanishi et al.

(10) Patent No.: US 11,068,142 B2
(45) Date of Patent: Jul. 20, 2021

(54) DISPLAY DEVICE AND NON-TRANSITORY COMPUTER-READABLE STORAGE MEDIUM STORING DISPLAY CONTROL PROGRAM

(71) Applicant: SEIKO EPSON CORPORATION, Tokyo (JP)

(72) Inventors: Hiroaki Nakanishi, Nagano (JP); Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/912,841

(22) Filed: Jun. 26, 2020

(65) Prior Publication Data

US 2020/0409539 A1   Dec. 31, 2020

(30) Foreign Application Priority Data

Jun. 28, 2019 (JP) .............................. JP2019-121696

(51) Int. Cl.
*G06F 3/0487* (2013.01)
*G06F 3/0484* (2013.01)
*G06F 3/0481* (2013.01)

(52) U.S. Cl.
CPC ........ *G06F 3/04845* (2013.01); *G06F 3/0487* (2013.01); *G06F 3/04817* (2013.01)

(58) Field of Classification Search
CPC ............... G06F 3/04845; G06F 3/0487; G06F 3/04817; G06F 1/1641; G06F 1/1677; G06F 1/1616; G06F 1/1652; G06F 3/0488
See application file for complete search history.

(56) References Cited

U.S. PATENT DOCUMENTS

| | | | | |
|---|---|---|---|---|
| 8,654,095 B1* | 2/2014 | Cho | ...................... | G06F 1/1641 345/173 |
| 10,416,720 B2* | 9/2019 | Lee | ...................... | G06F 1/1641 |
| 2007/0075915 A1* | 4/2007 | Cheon | ................... | G06F 1/1647 345/1.1 |
| 2009/0059497 A1* | 3/2009 | Kuwahara | ............... | A63F 13/26 361/679.27 |
| 2009/0278764 A1* | 11/2009 | Kuwahara | ............ | H04N 5/2251 345/1.3 |
| 2010/0081475 A1* | 4/2010 | Chiang | ............. | H04M 1/72403 455/564 |
| 2010/0182265 A1* | 7/2010 | Kim | ...................... | G06F 1/1641 345/173 |

(Continued)

FOREIGN PATENT DOCUMENTS

| | | |
|---|---|---|
| JP | 2014-145972 A | 8/2014 |
| WO | 2013/175751 A1 | 1/2016 |

*Primary Examiner* — Carolyn R Edwards
(74) *Attorney, Agent, or Firm* — Global IP Counselors, LLP

(57) ABSTRACT

A display section is configured to be set in a folded position and an unfolded position. When the display section is in the folded position, a display controller causes the display section to display, within a first display area, a plurality of objects and specific images linked to an N number of objects out of the plurality of objects, the specific images being used to receive an operation. When the display section is in the unfolded position, the display section displays the plurality of objects within the first display area and simultaneously to display, within the second display area, specific images linked to an M number of objects out of the plurality of objects, M being larger than N.

6 Claims, 7 Drawing Sheets

(56) References Cited

U.S. PATENT DOCUMENTS

| | | | |
|---|---|---|---|
| 2010/0184485 A1* | 7/2010 | Kim | G06F 3/1423 |
| | | | 455/566 |
| 2010/0298032 A1* | 11/2010 | Lee | G06F 1/1677 |
| | | | 455/566 |
| 2011/0230178 A1* | 9/2011 | Jones | H04M 1/0247 |
| | | | 455/422.1 |
| 2012/0117495 A1* | 5/2012 | Sirpal | G06F 3/1423 |
| | | | 715/761 |
| 2013/0076681 A1* | 3/2013 | Sirpal | G06F 1/1641 |
| | | | 345/173 |
| 2013/0321340 A1* | 12/2013 | Seo | G06F 1/1652 |
| | | | 345/174 |
| 2014/0096047 A1* | 4/2014 | Ha | G06F 3/0482 |
| | | | 715/768 |
| 2014/0101578 A1* | 4/2014 | Kwak | G06F 1/1647 |
| | | | 715/761 |
| 2014/0137041 A1* | 5/2014 | Jeon | G06F 1/1652 |
| | | | 715/815 |
| 2014/0152606 A1* | 6/2014 | Kunitake | G06F 1/1692 |
| | | | 345/173 |
| 2015/0338888 A1* | 11/2015 | Kim | G06F 3/04886 |
| | | | 345/156 |
| 2018/0039410 A1* | 2/2018 | Kim | G06F 1/1677 |
| 2020/0264826 A1* | 8/2020 | Kwon | G06F 1/1681 |
| 2020/0320906 A1* | 10/2020 | Knarr | G06F 1/1626 |

* cited by examiner

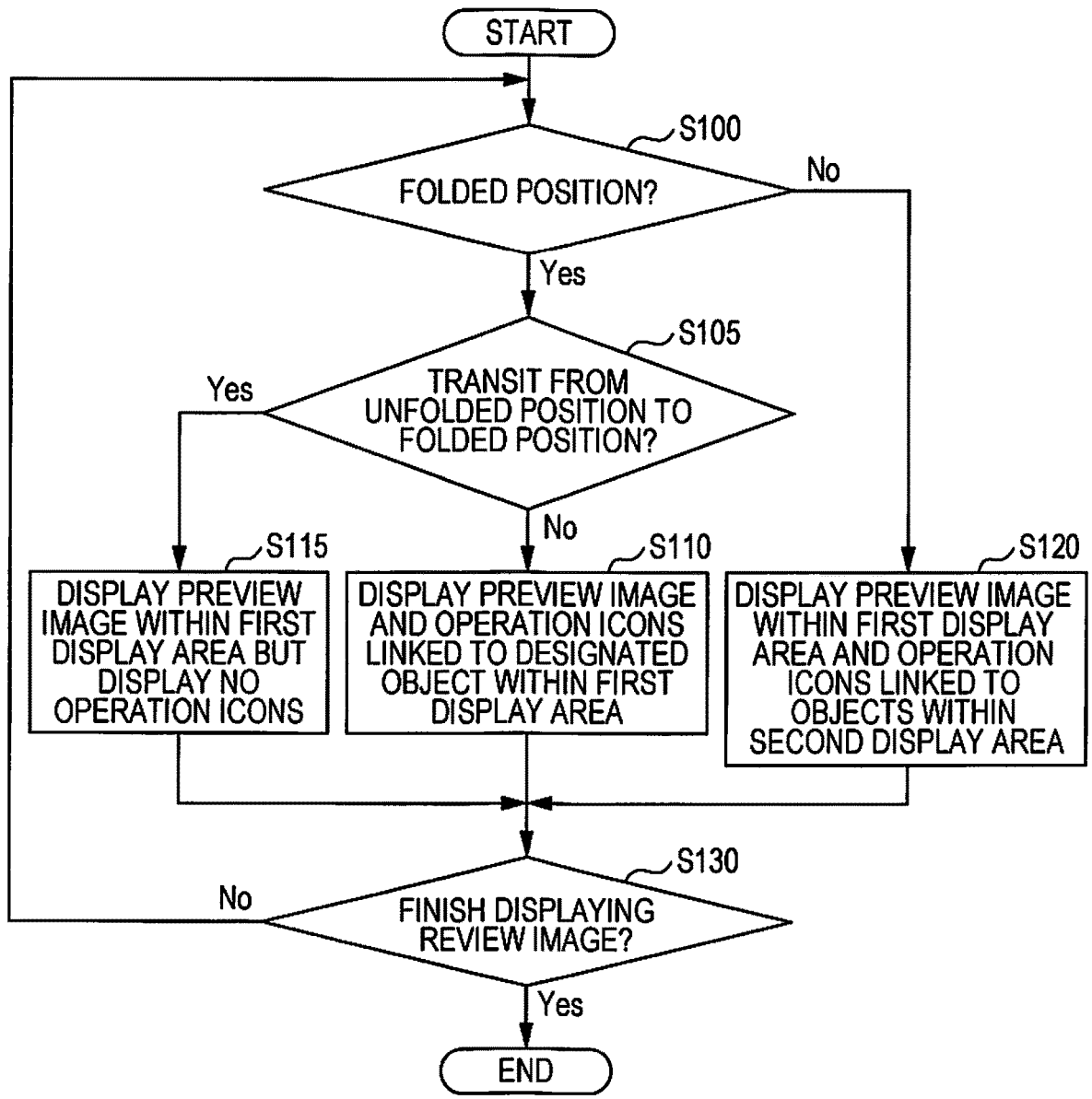

DISPLAY DEVICE AND NON-TRANSITORY COMPUTER-READABLE STORAGE MEDIUM STORING DISPLAY CONTROL PROGRAM

The present application is based on, and claims priority from JP Application Serial Number 2019-121696, filed Jun. 28, 2019, the disclosure of which is hereby incorporated by reference herein in its entirety.

BACKGROUND

1. Technical Field

The present disclosure relates to a display device and a computer-readable storage medium that stores a display control program to be executed by the display device.

2. Related Art

Some known display devices such as smartphones or tablets include two casings with touch panel screens, and these casings are joined together via a hinge, for example, as disclosed in WO-A-2013-175751. When a display device of this type is opened up so that both the touch panel screens are arranged side by side, it is selectively operable in two modes: a full-screen mode and a double application mode. In the full-screen mode, a single application is displayed on both the touch panel screens, whereas in the double application mode, two applications are independently displayed on the respective touch panel screens.

Display devices, as described above, have some room to provide optimally improved displays.

SUMMARY

The present disclosure is a display device that includes a display section, a determiner, and a display controller. The display section is configured to be set in a plurality of positions including a folded position and an unfolded position. In the folded position, the display section is folded at a location of a boundary between a first display area and a second display area so that the first display area and the second display area face in opposite directions. In the unfolded position, the display section is not folded at the location of the boundary so that the first display area and the second display area face in the same direction. The determiner determines in which position the display section is. The display controller controls a display operation of the display section. When the display section is in the folded position, the display controller causes the display section to display, within the first display area, a plurality of objects and specific images linked to an N number of objects out of the plurality of objects, the specific images being used to receive an operation, and not to display a specific image linked to an object other than the N number of objects out of the plurality of objects together with the specific images linked to the N number of objects. When the display section is in the unfolded position, the display controller causes the display section to display the plurality of objects within the first display area and simultaneously to display, within the second display area, specific images linked to an M number of objects out of the plurality of objects, M being larger than N.

BRIEF DESCRIPTION OF THE DRAWINGS

FIG. 6 is a flowchart of a display control process according to a first modification.

DESCRIPTION OF EXEMPLARY EMBODIMENTS

Some embodiments of the present disclosure will be described below with reference to the accompanying drawings. It should be noted that the drawings are simply illustrative for use in describing components in the embodiments, and thus the illustrated components may lack correct proportion and consistency. Besides, not all components are illustrated.

Configuration of Terminal Device

Figure 1:
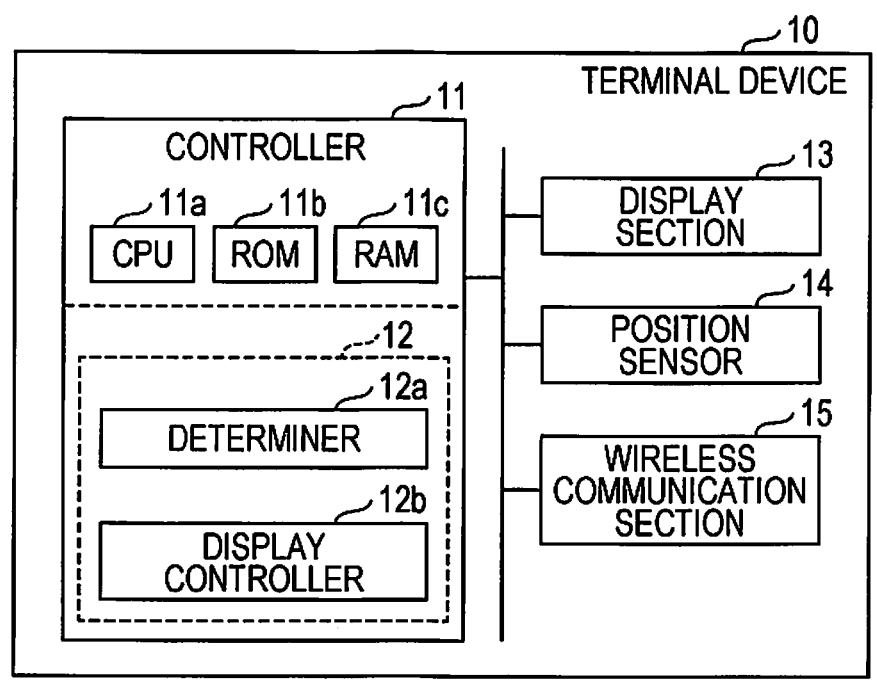
FIG. 1 is a schematic block diagram of a configuration of a terminal device according to an embodiment of the present disclosure.

FIG. 1 is a schematic block diagram of a configuration of a terminal device 10 according to an embodiment of the present disclosure. The terminal device 10 may be implemented by a smartphone or a tablet, for example. The terminal device 10 includes a controller 11, a display section 13, a position sensor 14, and a wireless communication section 15. The controller 11 may be a processor having a central processing unit (CPU) 11a, read only memory (ROM) 11b, and random access memory (RAM) 11c; this processor may include one or more integrated circuits (ICs).

The controller 11 controls an operation of the terminal device 10 by causing the processor or the CPU 11a to perform arithmetic processing in a working area of the RAM 11c in accordance with various programs stored in the ROM 11b and other memories. The controller 11 executes a display control program 12, which is one of the stored programs, to function as a determiner 12a and a display controller 12b.

Figure 2A:
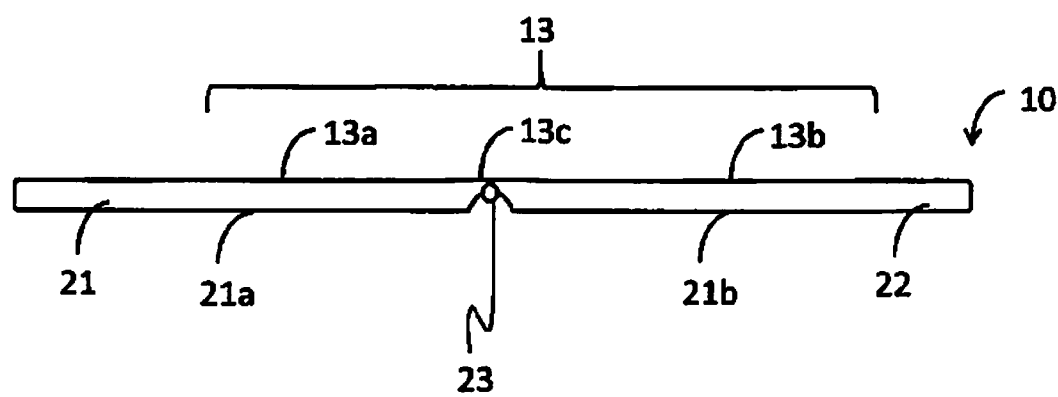
FIG. 2A illustrates the terminal device in an unfolded position.
Figure 2B:
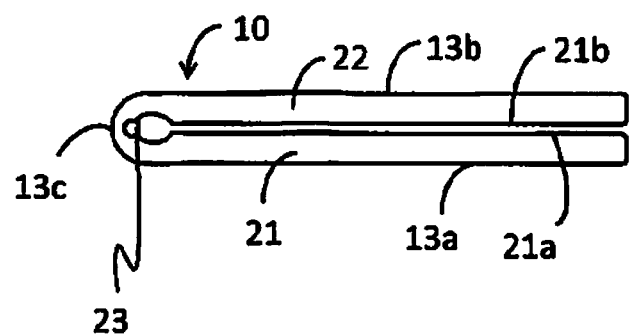
FIG. 2B illustrates the terminal device in a folded position.
Figure 3:
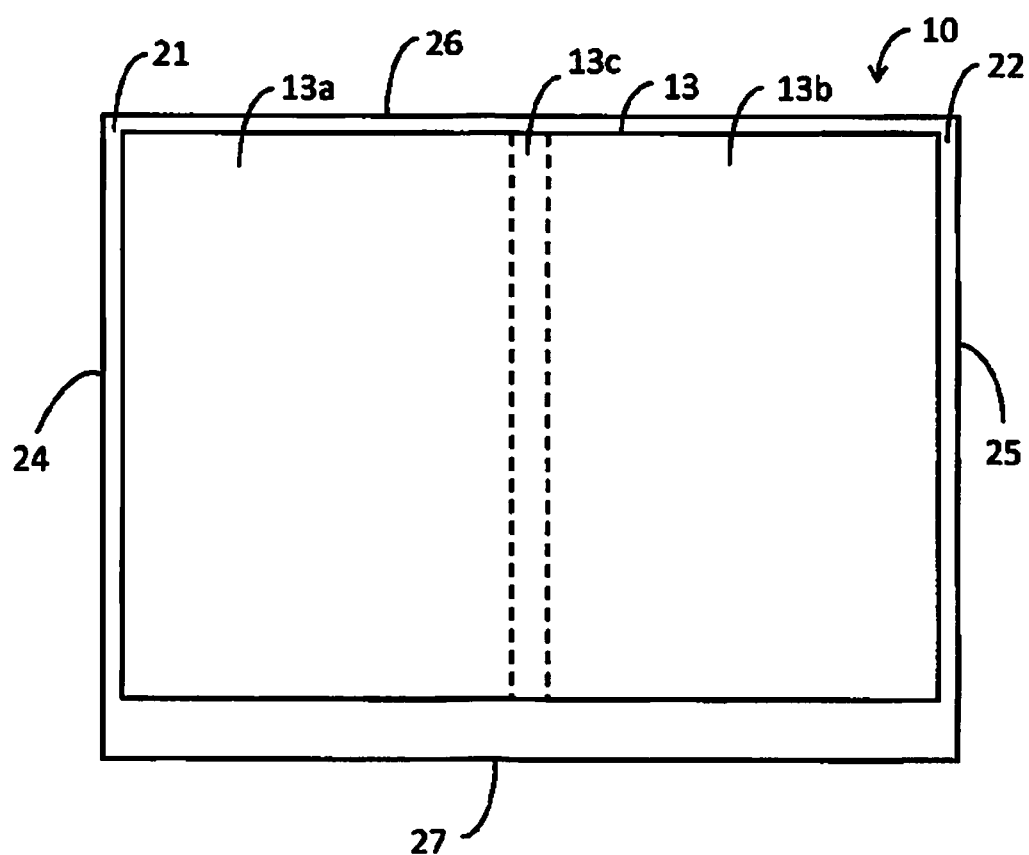
FIG. 3 illustrates the display section in the terminal device in the unfolded position as viewed from the front surface.

The display section 13 has a first display area 13a and a second display area 13b. As an example, the display section 13 may be implemented by a foldable or flexible display, for example, as illustrated in FIG. 2A, 2B, or 3 that will be referenced later. Examples of such flexible displays are disclosed in JP-A-2018-72663 and JP-A-2017-188027. The display section 13 may have a touch panel to be operated by a user. Herein, the terminal device 10 with the display section 13 may correspond to a display device.

The position sensor 14 may include one or more sensors that sense positions of the terminal device 10. The terminal device 10 is configured to be set in a plurality of positions, including a folded position and an unfolded position. In the folded position, the display section 13 is folded at the location of the boundary between the first display area 13a and the second display area 13b so that the first display area 13a and the second display area 13b face in opposite directions. In the unfolded position, the display section 13 is not folded at the location of the boundary so that the first display area 13a and the second display area 13b face in the same direction. The folded, unfolded, and other positions of the display section 13 may also be regarded as those of the terminal device 10.

The wireless communication section 15 conducts wireless communication with an external device, for example, via a public communication channel or a wireless local area network (LAN). The components illustrated in FIG. 1 represent some constituent elements possessed by the terminal device 10. Like a typical smartphone or tablet, for example, the terminal device 10 may further include a speaker, a microphone, a camera, a terminal pin to which a wire is to be connected, a physical button, and an acceleration sensor and a gyro sensor that sense an orientation and rotation of the terminal device 10.

FIGS. 2A and 2B illustrate the terminal device 10 in different positions. More specifically, FIG. 2A illustrates the terminal device 10 in the unfolded position, whereas FIG. 2B illustrates the terminal device 10 in the folded position. The terminal device 10 further includes a first casing 21 and a second casing 22, each of which may have a planar shape. The components of the terminal device 10 as illustrated in FIG. 1 are accommodated or mounted in the first casing 21 or/and the second casing 22. Both the first casing 21 and second casing 22 are joined together so as to be rotatable relative to each other around a hinge 23. Thus, a user can set the terminal device 10 in the unfolded position or the folded position by rotating one or both of the first casing 21 and the second casing 22 around the hinge 23. A portion of each of the first casing 21 and the second casing 22 which is joined to the hinge 23 may be made of a flexible or elastic material, in which case the user can easily set the terminal device 10 in the folded position illustrated in FIG. 2B.

Mounted on the front surfaces of the first casing 21 and the second casing 22, each of which has a planar shape, is a display section 13 as a single flexible display. Of the display section 13, the first display area 13a is defined on the first casing 21 and the second display area 13b is defined on the second casing 22. The display section 13 has a boundary area 13c, which contains the hinge 23 and is defined between the first display area 13a and the second display area 13b. Herein, the location at which the hinge 23 is disposed in the boundary area 13c corresponds to the location of the boundary between the first display area 13a and the second display area 13b. It should be noted that the boundary area 13c does not necessarily have to be defined definitely and it may be a portion of display section 13 which is bent when the display section 13 is set in the folded position.

As illustrated in FIG. 2A, when the terminal device 10 is in the unfolded position, both the first display area 13a and the second display area 13b face in the same direction. In this case, however, the first display area 13a and the second display area 13b do not necessarily have to face in exactly the same direction. Alternatively, the first display area 13a and the second display area 13b may face in slightly different directions unless the user perceives this difference.

As illustrated in FIG. 2B, when the terminal device 10 is in the folded position, both the first display area 13a and the second display area 13b face in opposite directions. More specifically, when the terminal device 10 is in the folded position, a first rear surface 21a of the first casing 21 which is opposite to the front surface of the first casing 21 on which the display section 13 is mounted is positioned so as to face a second rear surface 21b of the second casing 22 which is opposite to the front surface of the second casing 22 on which the display section 13 is mounted. In this case, however, the angle between orientations of the first display area 13a and the second display area 13b does not necessarily have to be 180 degrees sharp. Alternatively, this angle may slightly differ from 180 degrees unless the user recognizes this difference.

FIG. 3 illustrates the terminal device 10 in the unfolded position as viewed from the front surface of the display section 13. In FIG. 3, the first display area 13a, the boundary area 13c, and the second display area 13b are defined by broken lines drawn inside the display section 13, which may be implemented by a flexible display; it should be noted that these broken lines are not actually present. The terminal device 10 in a planar shape has four sides: a first side 24 and a second side 25 that extend in parallel with the longitudinal sides of the boundary area 13c; and a third side 26 that extends between first ends of the first side 24 and the second side 25; and a fourth side 27 that extends between second ends of the first side 24 and the second side 25.

The display section 13 does not necessarily have to be implemented by a single flexible display mounted on both the first casing 21 and the second casing 22; alternatively, the display section 13 may be implemented by two flexible displays mounted independently on the first casing 21 and the second casing 22. If the display section 13 is implemented by a first flexible display mounted on the first casing 21 and a second flexible display mounted on the second casing 22, the first flexible display may define the first display area 13a and the second flexible display may define the second display area 13b. In this case, the boundary area 13c may be absent in the display section 13, and the hinge 23 may define the boundary between the first display area 13a and the second display area 13b.

Display Control Process

Figure 4:
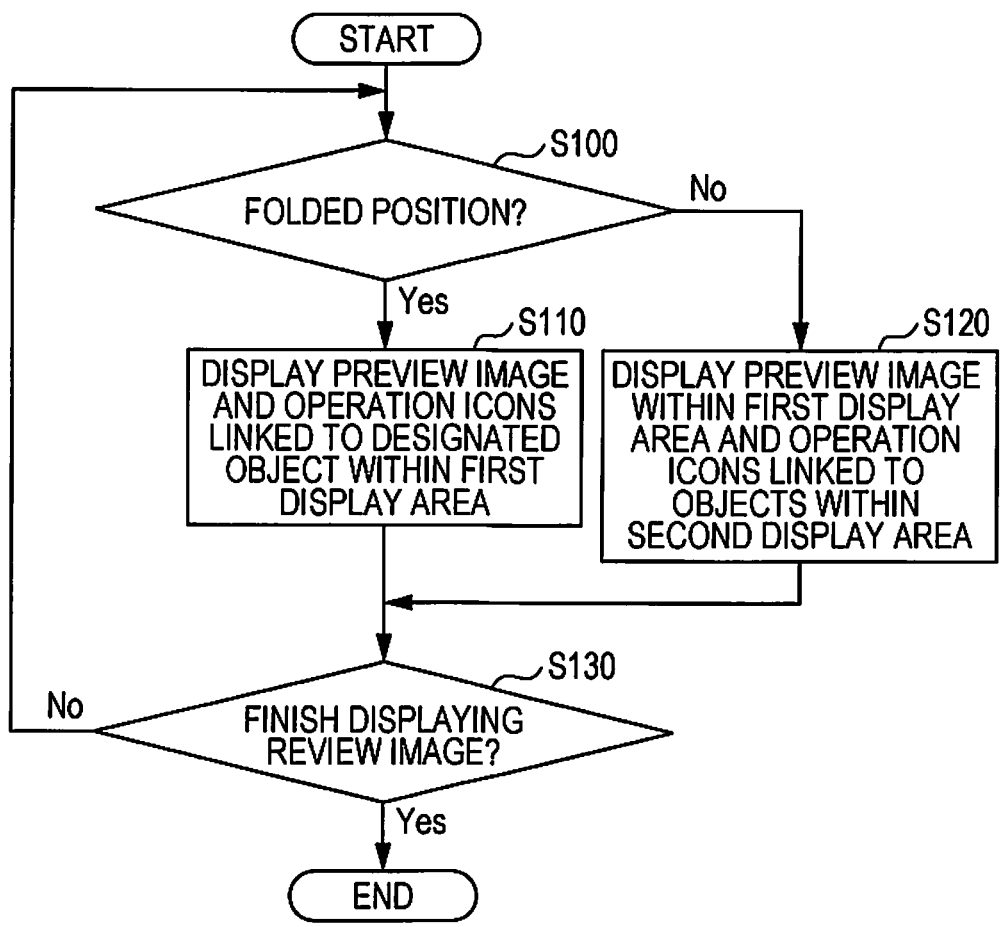
FIG. 4 is a flowchart of a display control process performed by the controller in the terminal device.

FIG. 4 is a flowchart of a display control process that the controller 11 performs in accordance with the display control program 12. With reference to this flowchart, the display control process will be described below. In the display control process, the display section 13 displays a preview screen of an image in accordance with a user' selection; this image will be printed by an unillustrated printer and may contain text, a picture, a computer graphic (CG), and other contents. In short, the controller 11 receives an instruction of displaying the preview screen of the image through a user's operation and, in response to this instruction, starts the display control process in the flowchart of FIG. 4.

At Step S100, first, the determiner 12a in the controller 11 determines whether the display section 13 is in the folded position, based on a sensing signal from the position sensor 14. When determining that the display section 13 is in the folded position (Yes at Step S100), the determiner 12a makes the display control process proceed to Step S110. When determining that the display section 13 is not in the folded position, namely, is in the unfolded position (No at Step S100), the determiner 12a makes the processing proceed to Step S120.

The position sensor 14 may be any sensor that outputs a sensing signal to the controller 11 which is required to identify whether the display section 13 is in the unfolded position or in the folded position. As an example, the position sensor 14 may be disposed on the first rear surface 21a near the first side 24 or on the second rear surface 21b near the second side 25. In this case, when both the first rear surface 21a and the second rear surface 21b are positioned close to each other as illustrated in FIG. 2B, the position sensor 14 may output the sensing signal to the controller 11 which indicates that both the first side 24 and the second side 25 are positioned close to each other, more specifically, that the display section 13 is in the folded position.

As an alternative example, the position sensor 14 may be any sensor that outputs a sensing signal to the controller 11 which indicates an angle between the first casing 21 and the second casing 22 disposed with the hinge 23 therebetween. As another alternative example, the terminal device 10 may have a locking mechanism to be operated by the user which physically locks the terminal device 10 in the folded position. When the locking mechanism locks the terminal device 10 in the folded position, the position sensor 14 may output the sensing signal to the controller 11 which indicates that the terminal device 10 is in the folded position.

At Step S110, the display controller 12b in the controller 11 causes the display section 13 to display, within the first display area 13a, a preview image and some operation icons linked to a designated object out of a group of objects selected by the user. The preview image may be an image that is displayed before a printing operation and constituted by a group of objects selected by the user. Each object may be an original image for one page which serves as the basis for the preview image, or may be an illustration, text, a comment, a graphic, or a stamp displayed in the original image.

The designated object may be one of the objects constituting the preview image which is designated by the user. The number of designated objects is denoted by N, which is set to one in this embodiment. This means that the user is not allowed to designate two or more objects at the same time.

Each of the operation icons is used to receive a user's operation and linked to a corresponding object. Herein, each operation icon may correspond to a specific image. Examples of the user's operation may include operations of moving an object, changing the shape of the object, deleting the object, and changing the overlapping order of objects. For example, the operation of moving an object may be an operation of rotating the object; the operation of changing the shape of an object may be an operation of zooming in or out or flipping the object.

At Step S110, the display controller 12b causes the display section 13 to display the preview image within the first display area 13a. Simultaneously, the display controller 12b also causes the display section 13 to display, within the first display area 13a, operation icons linked to the designated object out of the objects constituting the preview image. In this case, the display section 13 does not display operation icons linked to the objects other than the designated object.

At Step S120, the display controller 12b causes the display section 13 to display the preview image within the first display area 13a. Simultaneously, the display controller 12b also causes the display section 13 to display, within the second display area 13b, operation icons linked to an M number of objects out of the plurality of objects constituting the preview image. In this case, M denotes the total number of objects constituting the preview image and is greater than that of the designated object. For example, if the preview image is constituted by four objects, M may be set to four.

If the preview image is constituted by many objects, for example, the display section 13 may be unable to display the operation icons linked to all the objects within the second display area 13b at one time. Therefore, the upper limit of M may be set in advance for the display controller 12b. In this case, when the number of objects constituting the preview image is less than or equal to the upper limit, the display controller 12b may cause the display section 13 to display the operation icons linked to all the objects within the second display area 13b. However, when the number of objects constituting the preview image exceeds the upper limit, the display controller 12b may cause the display section 13 to display the operation icons linked to an upper limit number of objects out of all the objects within the second display area 13b.

While the screen at Step S110 or S120 is being displayed, at Step S130, the display controller 12b determines whether to receive an instruction of finishing displaying the preview image through a user's operation. When receiving the instruction (Yes at Step S130), the display controller 12b causes the display section 13 to finish displaying the preview image and the operation icons and then concludes the display control process in the flowchart of FIG. 4. When not receiving the instruction (No at Step S130), the display controller 12b makes the display control process return to Step S100.

Figure 5A:
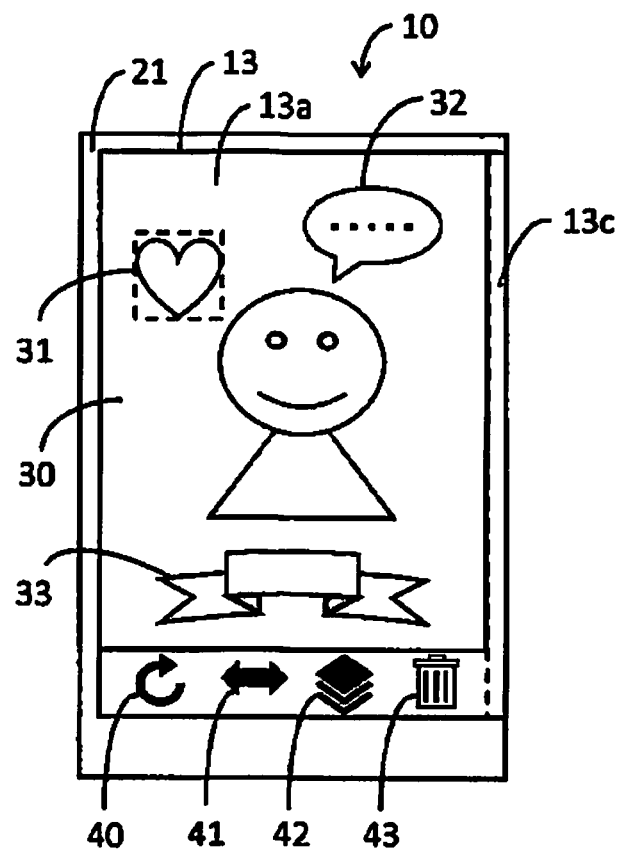
FIG. 5A illustrates a preview image and some operation icons that the terminal display displays during the display control process at Step S110.

FIG. 5A illustrates the preview image and the operation icons that the display controller 12b causes the display section 13 to display within the first display area 13a at Step S110. The preview image and the operation icons as illustrated in FIG. 5A are continuously displayed after when Yes is selected at Step S100 of the flowchart in FIG. 4 and until Yes is selected at Step S130. It should be noted that the user cannot view the second display area 13b in the example of FIG. 5A because the terminal device 10 is in the folded position.

In FIG. 5A, the preview image constituted by a plurality of objects denoted by reference numerals 30, 31, 32, and 33 is displayed within the first display area 13a. Specifically, the reference numeral 30 denotes an original image of a person's picture; the reference numeral 31 denotes a graphic of a heart; the reference numeral 32 denotes a graphic of a balloon containing text; and the reference numeral 33 denotes a graphic of a ribbon. The original image 30 and the graphics 31 to 33 are objects that the user has selected by operating the display section 13 acting as a touch panel and then the display controller 12b has displayed in response to the user's selection. The graphics 31 to 33 are objects present in the original image 30 in order to decorate the original image 30.

In FIG. 5A, the graphic 31, which is one of the objects constituting the preview image, corresponds to the designated object and thus surrounded by the broken line. The user can designate any object within the first display area 13a as a designated object by touching it. If the user designates no object as the designated object, the display controller 12b may designate the original image 30 as the designated object.

Displayed within a lower portion of the first display area 13a are a plurality of operation icons 40, 41, 42, and 43 linked to the designated object. In this case, in response to designating one of the plurality of objects within the first display area 13a at Step S110, the display controller 12b causes the display section 13 to display the operation icons lined to the designated object within the first display area 13a.

The operation icon 40 is an icon used to rotate the object; the operation icon 41 is an icon used to laterally flip the object; the operation icon 42 is an icon used to change the overlapping order of objects; and the operation icon 43 is an icon used to delete the object. In addition to the operation icons 40 to 43, some other icons may also be displayed at Step S110 or S120. As an example, an operation icon for use in decorating or coloring an object may be displayed.

The user can operate any operation icon within the first display area 13a. When sensing the operation of any operation icon within the first display area 13a, the display controller 12b reflects the sensed operation in the designated object within the first display area 13a. For example, the display controller 12b may change the location or shape of the designated object or the overlapping order of the designated object and other objects. By operating any operation icon within the first display area 13a in this manner, the user can perform a desired process on the designated object, such as moving it or changing its shape.

Figure 5B:
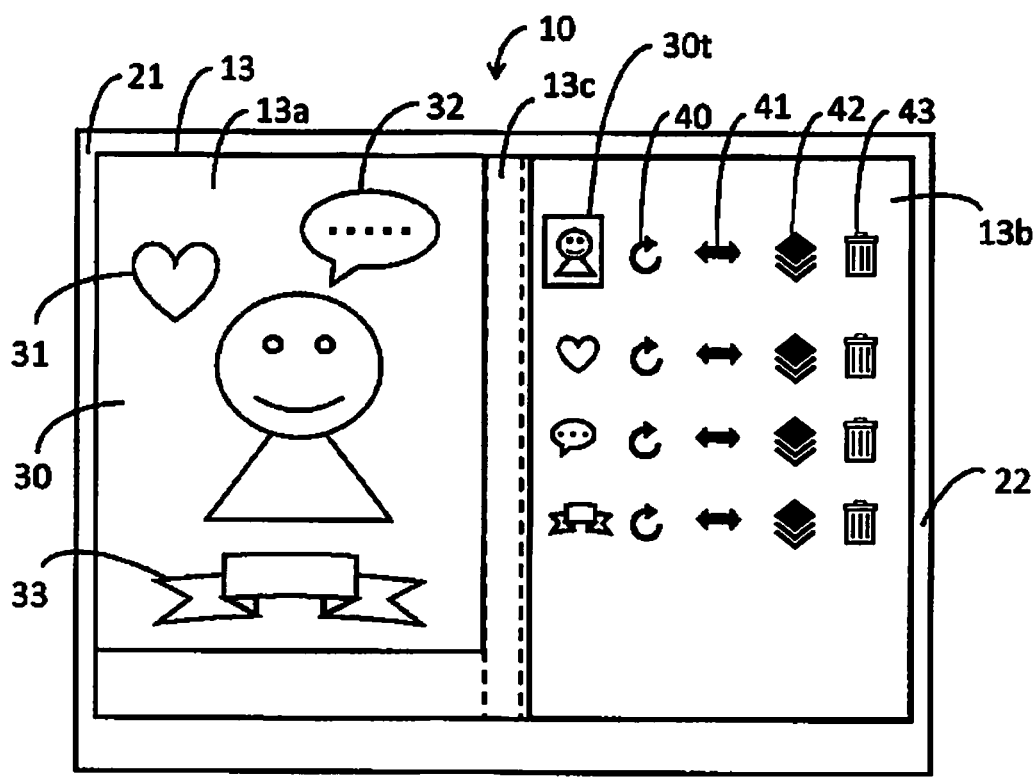
FIG. 5B illustrates a preview image and some operation icons that the terminal display displays during the display control process at Step S120.

FIG. 5B illustrates the preview image and the operation icons that the display controller 12b causes the display section 13 to display, respectively, within the first display area 13a and the second display area 13b at Step S120. The preview image and the operation icons as illustrated in FIG. 5B are continuously displayed after the No is selected at Step S100 of the flowchart in FIG. 4 and until Yes is selected at Step S130. It should be noted that the terminal device 10 is in the unfolded position in FIG. 5B.

FIG. 5B is similar to FIG. 5A in that the preview image constituted by the original image 30 and the graphics 31 to 33 is displayed within the first display area 13a. However, FIG. 5B differs from FIG. 5A in that no operation icons are displayed within the first display area 13a. Instead, a plurality of operation icons 40 to 43 linked to each of the objects, namely, to each of the original image 30 and the graphics 31 to 33 constituting the preview image are displayed within the second display area 13b.

In addition to the above, thumbnail images of the original image 30 and the graphic 31 to 33 are also displayed within the second display area 13b. The reference symbol 30t denotes the thumbnail image of the original image 30. Within the second display area 13b, the operation icons 40 to 43 are arrayed next to each thumbnail image. As an example, the operation icons 40 to 43 linked to the original image 30 may be arrayed next to the thumbnail image 30t of the original image 30.

The user can operate any operation icon linked to a given object, more specifically, the thumbnail image of a given object within the second display area 13b. When sensing the operation of an operation icon within the second display area 13b, the display controller 12b reflects the sensed operation in the object linked to the operated operation icon within the first display area 13a. For example, the display controller 12b may change the location or shape of the object or overlapping order of the object and other objects. At Step S120, the display controller 12b may cause the display section 13 to display, within the second display area 13b, various operation icons in accordance with the objects constituting the preview image. In short, when the terminal device 10 is in the unfolded position, the user does not have to designate any object within the preview image as an object to be operated, although this designation is needed when the terminal device 10 is in the folded position.

When the display section 13 transmits from the folded position to the unfolded position, at Step S110, the display controller 12b hides the operation icons 40 to 43 that have been displayed within the first display area 13a, unlike the example of FIG. 5A. Instead, at Step S120, the display controller 12b causes the display section 13 to display, within the second display area 13b, the operation icons 40 to 43 linked to objects constituting the preview image, as illustrated in FIG. 5B.

At Step S110, the operation icons 40 to 43 may be arrayed in this order from the left to right of the first display area 13a, as illustrated in FIG. 5A. Likewise, at Step S120, the operation icons 40 to 43 linked to each object may be arrayed in this order from the left to right of the second display area 13b, as illustrated in FIG. 5B.

As an alternative example, at Step S120, a plurality of operation icons linked to each object may be arrayed within the second display area 13b in accordance with frequencies at which these operation icons have been operated. In this case, the display controller 12b may store in advance the operating frequencies of the operation icons 40 to 43. For example, if the operating frequencies of the operation icons 42, 40, 43, and 41 decline in this order, at Step S120, the display controller 12b may cause the display section 13 to display the operation icons 42, 40, 43, and 41 so as to be arrayed in this order from the left to right of the second display area 13b.

At Step S120, the display controller 12b may cause the display section 13 to display operation icons linked to individual objects in accordance with frequencies at which these objects have been operated in the preview image at Step S110. In this case, the display controller 12b may store in advance frequencies at which the original image 30 and the graphics 31 to 33 have been operated as a designated object at Step S110. For example, if the operating frequency of the graphics 31, 33, and 32 and the original image 30 decline in this order, at Step S120 following Steps S110 and S100, the display controller 12b may cause the display section 13 to display the thumbnail images of the graphics 31, 33, and 32 and the original image 30 so as to be arrayed in this order from the top to bottom of the second display area 13b. Simultaneously, the display controller 12b may cause the display section 13 to further display the operation icons next to each thumbnail image.

As described above, at Step S120, the display controller 12b causes the display section 13 to display operation icons within the second display area 13b so as to be arrayed in accordance with frequencies at which these operation icons have been operated and to further display the thumbnail images of objects so as to be arrayed in accordance with frequencies at which these objects have been operated as designated objects. In this way, the terminal device 10 provides good usability for the user.

Since the original image 30 is the background of the graphics 31 to 33, the operation icon 42 used to change an overlapping order of the original image 30 and other objects is unnecessary. Therefore, at Step S120, the display controller 12b may cause the display section 13 to display only the operation icons 40, 41, and 43 within the second display area 13b in relation to the thumbnail image 30t of the original image 30. In other words, the display section 13 does not have to display the operation icon 42. In short, at Step S120, the display controller 12b may cause the display section 13 to display different operation icons in relation to individual objects constituting the preview image within the second display area 13b.

As described above, if the preview image is constituted by many objects, at Step S120, the display section 13 may be unable to display the operation icons linked to all the objects within the second display area 13b at one time. Therefore, when the number of objects constituting the preview image exceeds an upper limit at which operation icons can be arrayed at one time within the second display area 13b, at Step S120, the display controller 12b may cause the display section 13 to display the operation icons linked to an upper limit number of objects within the second display area 13b.

Then, when receiving a scroll operation on the second display area 13b, the display controller 12b may cause the display section 13 to display the operation icons linked to the remaining objects within the second display area 13b.

Conclusion

According to an embodiment of the present disclosure, a display device includes a display section 13, a determiner 12a, and a display controller 12b. The display section 13 is configured to be set in a plurality of positions including a folded position and an unfolded position. In the folded position, the display section 13 is folded at a location of a boundary between a first display area 13a and a second display area 13b so that the first display area 13a and the second display area 13b face in opposite directions. In the unfolded position, the display section 13 is not folded at the location of the boundary so that the first display area 13a and the second display area 13b face in the same direction. The determiner 12a determines in which position the display section 13 is. The display controller 12b controls a display operation of the display section 13. When the display section 13 is in the folded position, the display controller 12b causes the display section 13 to display, within the first display area 13a, a plurality of objects and specific images linked to an N number of objects out of the plurality of objects, the specific images being used to receive an operation, and not to display a specific image linked to an object other than the N number of objects out of the plurality of objects together with the specific images linked to the N number of objects. When the display section 13 is in the unfolded position, the display controller 12b causes the display section 13 to display the plurality of objects within the first display area 13a and simultaneously to display, within the second display area 13b, specific images linked to an M number of objects out of the plurality of objects, M being larger than N. For example, positions of the display section 13 other than the folded position and the unfolded position may be those of the display section 13 in the transition between the folded position and the unfolded position.

As described above, when the display section 13 is in the unfolded position, the display controller 12b causes the display section 13 to display the plurality of objects within the first display area 13a and simultaneously to display specific images, or operation icons, linked to an M number of objects within the second display area 13b, M being larger than N. With this configuration, the display section 13 can effectively use both the first display area 13a and the second display area 13b when the display section 13 is in the unfolded position, thereby allowing a user to easily view the images of a plurality of objects and specific images linked to these objects. In this case, the display controller 12b causes the display section 13 to display the specific images linked to each object within the second display area 13b, thereby allowing the user to easily operate these objects.

In the above display device, each of the specific images may contain at least one of a plurality of icons used to receive instructions of moving a corresponding one of the objects, changing a shape of the object, deleting the object, and changing overlapping order of the objects.

The above configuration allows the user to operate a specific image acting as an operation icon to perform a desired process on an object, such as moving it, changing its shape, deleting it, or changing its overlapping order.

In the above display device, when the display section 13 is in the folded position, the display controller 12b may cause, in response to designating any object out of the plurality of objects displayed within the first display area 13a, the display section 13 to display a specific image linked to the designated object within the first display area 13a.

As described above, the display section displays the specific images linked to the designated object within the first display area 13a when the user designates any of a plurality of objects displayed within the first display area 13a as a designated object. This configuration allows the user to perform a desired operation on the designated object.

In the above display device, when the display section 13 transits from the folded position to the unfolded position and further transits to the folded position, the display controller 12b may cause the display section 13 to hide the specific images linked to the N number of objects which have been displayed within the first display area 13a and, in turn, to display the specific images linked to the M number of objects within the second display area 13b.

With the above configuration, in response to the transition from the folded position to the unfolded position of the display section 13, the display controller 12b causes the display section 13 to hide specific images from the first display area 13a and, in turn, to display these specific images within the second display area 13b.

According to another embodiment of the present disclosure, a non-transitory computer-readable storage medium that stores a display control program 12 that controls an image display operation of a display section 13. The display section 13 is configured to be set in a plurality of positions including a folded position and an unfolded position. The display control program 12 causes the display section 13 to perform a method including: displaying, when the display section 13 is in the folded position, a plurality of objects and specific images linked to an N number of objects out of the plurality of objects within the first display area 13a, the specific images being used to receive an operation, and not displaying a specific image linked to an object other than the N number of objects out of the plurality of objects together with the specific images linked to the N number of objects; and displaying, when the display section 13 is in the unfolded position, the plurality of objects within the first display area 13a and simultaneously to display, within the second display area 13b, specific images linked to an M number of objects out of the plurality of objects, M being larger than N.

MODIFICATIONS

Some modifications of the foregoing embodiment will be described below. It should be noted that this description will be mainly centered on differences from the embodiment and other modifications.

First Modification

FIG. 6 is a flowchart of a display control process according to a first modification which the controller 11 performs in accordance with the display control program 12. The flowchart of FIG. 6 differs from that of FIG. 4 in including Steps S105 and S115. When the determiner 12a determines that the display section 13 is in the folded position at Step S100 (Yes at Step S100), at Step S105, the determiner 12a further determines whether the display section 13 was in the unfolded position before it is set in the folded position.

The determiner 12a stores a history of results of determinations that have been made since the display control process in the flowchart of FIG. 6 started. After the display control process in the flowchart of FIG. 6 has started, the determiner 12a determines whether the display section 13 is set in the folded position. When determining that the display section 13 is set in the folded position at least once, the determiner 12a, in turn, determines whether the display section 13 is set in the unfolded position. When determining that the display section 13 is set in the unfolded position at least once, the determiner 12a, in turn, determines whether the display section 13 is in the folded position again. When determining that the display section 13 is set in the folded position at least once (Yes at Step S105), the determiner 12a makes the display control process proceed to Step S115. In this display control process, once the determiner 12a determines that the display section 13 is in the folded position at Step S100 (Yes at Step S100), at Step S105, the determiner 12a usually determines that the display section 13 was in the unfolded position before it is set in the folded position. This determination process is continued until the display controller 12b receives an instruction of finishing displaying the preview image through a user's operation at Step S130. On the other hand, when determining that the display section 13 is kept in the folded position without being set in the unfolded position at Step S105 (No at Step S105), the display controller 12b makes the display control process proceed to Step S110.

At Step S115, the display controller 12b causes the display section 13 to display a preview image within the first display area 13a. In this case, the display section 13 displays no operation icons within the first display area 13a nor the second display area 13b.

Figure 7:
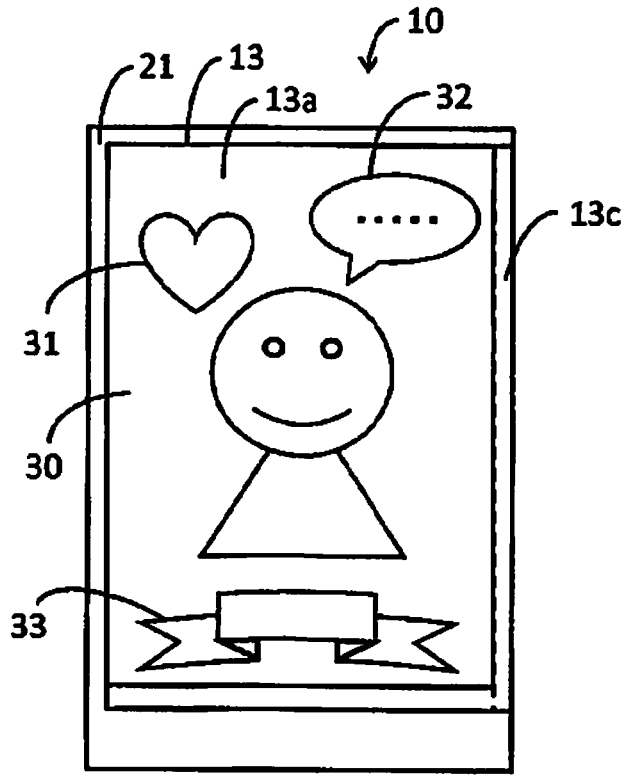
FIG. 7 illustrates a preview image that the terminal device displays during a display control process according to the first modification at Step S115.

FIG. 7 illustrates a preview image that the display controller 12b causes the display section 13 to display within the first display area 13a of the display section 13 when it performs the display control process according to the first modification at Step S115. It should be noted that the user cannot view the second display area 13b in the case of FIG. 7 because the terminal device 10 is in the folded position. FIG. 7 is similar to FIG. 5A in that the preview image constituted by the original image 30 and the graphics 31 to 33 is displayed within the first display area 13a, but the operation icons 40 to 43 are not present within the first display area 13a in FIG. 7.

In the example of FIG. 7, the preview image that the display controller 12b causes the display section 13 to display within the first display area 13a at Step S115 may be larger in size than that displayed at Step S110. In the example of FIG. 5A, although the operation icons 40 to 43 are present outside the preview image within the first display area 13a, they may be present inside the preview image at Step S110. Because the operation icons 40 to 43 are not present at Step S115 unlike the case of Step S110 in which they are present inside the preview image, the user can easily view the preview image. After having performed the display operation at Step S110, S115, or S120, the display controller 12b performs the determination process at Step S130.

In the first modification, as described above, when the determiner 12a determines that the display section 13 transits from the folded position to the unfolded position and then further transits to the folded position, the display controller 12b hides the specific images from both the first display area 13a and the second display area 13b. This configuration allows the user to hide operation icons from both the first display area 13a and the second display area 13b by unfolding the folded terminal device 10 that has been in the folded position and then folding it again. The user thereby can easily view the preview image within the first display area 13a.

Second Modification

Figure 8:
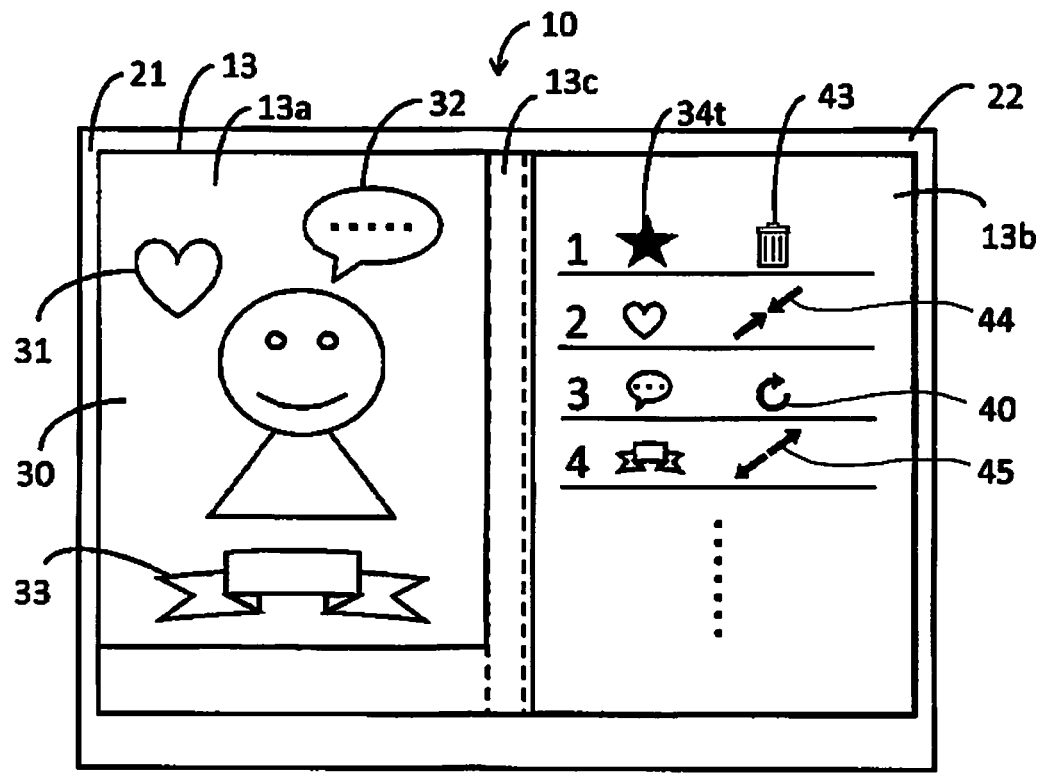
FIG. 8 illustrates a preview image and some operation icons that the terminal device displays during a display control process according to a second modification at Step S120.

At Step S120 in the flowchart of FIG. 4, the display controller 12b may cause the display section 13 to display operation icons, based on the history of operations that the user has ever performed on the preview image. FIG. 8 illustrates a preview image and some operation icons that the display controller 12b causes the display section 13 to display, respectively, within the first display area 13a and the second display area 13b during the display control process according to the second modification at Step S120.

In FIG. 8, numbers 1 to 4 are listed within the second display area 13b in accordance with the sequence in which the user has performed operations on the preview image. Further, a smaller number indicates an operation that the user has performed earlier. In addition to these numbers, thumbnail images of objects that have been operated by the user and operation icons that indicate operations that the user has performed are present within the second display area 13b. Furthermore, a character 34t denotes a thumbnail image of a graphic of a star, which is one of the objects; an operation icon 44 is an icon used to zoom down a corresponding object; and an operation icon 45 is an icon used to zoom up a corresponding object.

The display controller 12b stores the history of operations that the user has performed on the preview image since the display control process started. Whenever the user operates any operation icon, the display controller 12b stores the preview image displayed upon the operation. As can be seen from the second display area 13b in FIG. 8, the user sequentially deletes the heart graphic from the preview image, zooms down a graphic 31 of a heart contained in the preview image, rotates a graphic 32 of a bloom contained in the preview image, and zooms up a graphic 33 of a ribbon contained in the preview image. It should be noted that the image displayed within the first display area 13a corresponds to the latest preview image on which the user has sequentially performed those operations.

By touching any of the numbers listed within the second display area 13b, the user can conform a desired past preview image. For example, when the user touches number 1 within the second display area 13b in the case of FIG. 8, the display controller 12b causes the display section 13 to display, within the first display area 13a, a preview image that has been displayed immediately before the star graphic was deleted. When the user touches number 4 within the second display area 13b, the display controller 12b causes the display section 13 to display, within the first display area 13a, the preview image that has been displayed immediately before the graphic 33 of a ribbon was zoomed up. According to the second modification, as described above, the user can touch any number within the second display area 13b of the terminal device 10 in the unfolded position, thereby causing a desired past preview image to appear in the second display area 13b and confirming it.

Other Modifications

Number N indicating the number of designated objects may be any number smaller than M. For example, if N is set to two, the user may designate two objects at the same time. In response, at Step S110, the display controller 12b may cause the display section 13 to display specific images, or operation icons, linked to the designated objects within the first display area 13a.

In the foregoing embodiment and modifications, the specific images are implemented by the operation icons 40 to 45; however, each specific image is not limited to an icon. Alternatively, each specific image may be a character displayed by the display section 13.

Obviously, the display control processes in this embodiment and the modifications are applicable to not only a preview image to be displayed before a printing operation but also other images, such as an image constituted by a plurality of objects which is to be processed or monitored. This means that the terminal device 10 may be employed for any application other than a printing application.

What is claimed is:

1. A display device comprising:
    a display section configured to be set in a plurality of positions including a folded position and an unfolded position, in the folded position the display section being folded at a location of a boundary between a first display area and a second display area so that the first display area and the second display area face in opposite directions, in the unfolded position the display section being not folded at the location of the boundary so that the first display area and the second display area face in the same direction;
    a determiner that determines in which position the display section is; and
    a display controller that controls a display operation of the display section, wherein
    when the display section is in the folded position, the display controller causes the display section to display, within the first display area, a plurality of objects and specific images linked to an N number of objects out of the plurality of objects, the specific images being used to receive an operation, and not to display a specific image linked to an object other than the N number of objects out of the plurality of objects together with the specific images linked to the N number of objects, and
    when the display section is in the unfolded position, the display controller causes the display section to display the plurality of objects within the first display area and simultaneously to display, within the second display area, specific images linked to an M number of objects out of the plurality of objects, M being larger than N.

2. The display device according to claim 1, wherein each of the specific images contains at least one of a plurality of icons used to receive instructions of moving a corresponding one of the objects, changing a shape of the object, deleting the object, and changing overlapping order of the objects.

3. The display device according to claim 1, wherein when the display section is in the folded position, the display controller causes, in response to designating any object out of the plurality of objects displayed within the first display area, the display section to display a specific image linked to the designated object within the first display area.

4. The display device according to claim 1, wherein when the display section transits from the folded position to the unfolded position, the display controller causes the display section to hide the specific images linked to the N number of objects which have been displayed within the first display area and, in turn, to display the specific images linked to the M number of objects within the second display area.

5. The display device according to claim 1, wherein when the display section transits from the folded position to the unfolded position and further transits to the folded position, the display controller causes the display section to hide the specific images from both the first display area and the second display area.

6. A non-transitory computer-readable storage medium storing a display control program that controls an image display operation of a display section, the display section being configured to be set in a plurality of positions including a folded position and an unfolded position, in the folded position the display section being folded at a location of a boundary between a first display area and a second display area so that the first display area and the second display area face in opposite directions, in the unfolded position the display section being not folded at the location of the boundary so that the first display area and the second display area face in the same direction, the display control program causing the display section to perform a method comprising:
    displaying, when the display section is in the folded position, a plurality of objects and specific images linked to an N number of objects out of the plurality of objects within the first display area, the specific images being used to receive an operation, and not displaying a specific image linked to an object other than the N number of objects out of the plurality of objects together with the specific images linked to the N number of objects; and
    displaying, when the display section is in the unfolded position, the plurality of objects within the first display area and simultaneously to display, within the second display area, specific images linked to an M number of objects out of the plurality of objects, M being larger than N.

* * * * *